United States Patent
Tagawa et al.

(10) Patent No.: US 10,563,071 B2
(45) Date of Patent: *Feb. 18, 2020

(54) METHOD FOR PRODUCING CONDUCTIVE POLYMER-CONTAINING DISPERSION

(71) Applicant: SHOWA DENKO K.K., Minato-ku, Tokyo (JP)

(72) Inventors: Yasuyuki Tagawa, Tokyo (JP); Naoki Murata, Tokyo (JP); Motoaki Araki, Tokyo (JP); Takashi Ohkubo, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/770,196

(22) PCT Filed: Mar. 11, 2014

(86) PCT No.: PCT/JP2014/056372
§ 371 (c)(1),
(2) Date: Aug. 25, 2015

(87) PCT Pub. No.: WO2014/142133
PCT Pub. Date: Sep. 18, 2014

(65) Prior Publication Data
US 2016/0024315 A1    Jan. 28, 2016

(30) Foreign Application Priority Data

Mar. 11, 2013  (WO) .................. PCT/JP2013/056680

(51) Int. Cl.
*C09D 5/24* (2006.01)
*C08G 75/06* (2006.01)
*C08G 73/02* (2006.01)
*C08G 61/12* (2006.01)

(52) U.S. Cl.
CPC ............. *C09D 5/24* (2013.01); *C08G 61/124* (2013.01); *C08G 61/126* (2013.01); *C08G 73/0266* (2013.01); *C08G 75/06* (2013.01); *C08G 2261/135* (2013.01); *C08G 2261/1424* (2013.01); *C08G 2261/3221* (2013.01); *C08G 2261/3223* (2013.01); *C08G 2261/43* (2013.01); *C08G 2261/77* (2013.01); *C08G 2261/794* (2013.01); *C08G 2261/962* (2013.01)

(58) Field of Classification Search
None
See application file for complete search history.

(56) References Cited

U.S. PATENT DOCUMENTS

| | | | |
|---|---|---|---|
| 5,766,515 A | 6/1998 | Jonas et al. | |
| 6,083,635 A | 7/2000 | Jonas et al. | |
| 6,593,399 B1* | 7/2003 | La Fleur | C08G 61/122 523/201 |
| 2003/0065090 A1 | 4/2003 | Kelly et al. | |
| 2004/0127637 A1 | 7/2004 | Hsu et al. | |
| 2004/0222413 A1 | 11/2004 | Hsu et al. | |
| 2007/0105991 A1 | 5/2007 | Jonas et al. | |
| 2008/0125571 A1 | 5/2008 | Oohata et al. | |
| 2008/0210910 A1 | 9/2008 | Hsu et al. | |
| 2009/0072201 A1 | 3/2009 | Hsu et al. | |
| 2011/0049433 A1 | 3/2011 | Jonas et al. | |
| 2011/0144265 A1* | 6/2011 | Durant | C08F 222/14 524/533 |
| 2011/0278559 A1* | 11/2011 | Brown | C08G 61/126 257/40 |
| 2012/0229955 A1 | 9/2012 | Biler | |

FOREIGN PATENT DOCUMENTS

| | | |
|---|---|---|
| CN | 1681869 A | 10/2005 |
| CN | 1962780 A | 5/2007 |
| CN | 101039985 A | 9/2007 |
| CN | 101284927 * | 10/2008 |
| CN | 101977960 A | 2/2011 |
| CN | 102881461 A | 1/2013 |
| EP | 0686662 A2 | 12/1995 |
| EP | 1993113 A1 | 11/2008 |
| EP | 2336255 A1 | 6/2011 |
| JP | 04-293970 A | 10/1992 |
| JP | 06-093190 A | 4/1994 |
| JP | 07-090060 A | 4/1995 |
| JP | 2002-356654 A | 12/2002 |
| JP | 2004-189796 A | 7/2004 |
| JP | 2004-241132 A | 8/2004 |
| JP | 2005-076016 A | 3/2005 |
| JP | 2007-297500 A | 11/2007 |
| JP | 2011-510141 A | 3/2011 |

(Continued)

OTHER PUBLICATIONS

Yin et al. Facile synthesis and light scattering characteristics of polystyrene/poly(3,4-ethylenedioxythiophene) nanocomposite particles. Polymer 52 (2011) 4785-4791 (Year: 2011).*

(Continued)

*Primary Examiner* — Tanisha Diggs
(74) *Attorney, Agent, or Firm* — Sughrue Mion, PLLC

(57) ABSTRACT

The present invention provides a method for producing a conductive polymer-containing dispersion, including: a polymerization step of polymerizing a monomer for obtaining a conjugated conductive polymer in a dispersion medium including the monomer and seed particles converted into a colloid protected by a polyanion.

17 Claims, No Drawings

(56) References Cited

FOREIGN PATENT DOCUMENTS

| KR | 100919272 B1 * | 9/2009 |
|---|---|---|
| KR | 10-2011-0014554 A | 2/2011 |
| WO | 2008/114810 A1 | 9/2008 |
| WO | 2009/112382 A1 | 9/2009 |

OTHER PUBLICATIONS

Sun et al. The synthesis and characterization of electrical and magnetic nanocomposite: PEDOT/PSS-Fe3O4. Materials Chemistry and Physics 118 (2009) 288-292 (Year: 2009).*

Kang et al. Preparation of PEDOT/PSSA Conductive Nanoparticles for Dielectrophoretic Display, Macromolecular Resarch vol. 21, No. 6, 693-698 (Year: 2013).*

Khan et al. Synthesis and Characterization of Micrometer-Sized Poly(3,4-ethylenedioxythiophene)-Coated Polystyrene Latexes. Langmuir 1999, 15, 3469-3475 (Year: 1999).*

Han et al. Crystalline Colloidal Arrays Composed of Poly(3,4-ethylenedioxythiophene)-Coated Polystyrene Particles with Stop Band in the Visible Regime, Adv Mater, 2004, 16, 3, (Year: 2004).*

Communication dated Aug. 5, 2016 from the European Patent Office in counterpart application No. 14763721.9.

Wang et al., "Method for preparation of polystyrene-poly(3,4-ethylenedioxythiophene) electro-conductive polymer composite particles," Nanjing University P.R.C. (Oct. 2008) 7 pages total.

Lee et al., "Synthesis of polystyrene/polythiophene core/shell nanoparticles by dual initiation," Polymer; vol. 52 (2011) pp. 4227-4234.

Houben-Weyl, "Methoden derorganischen Chemie", Makromolekulare Stoffe, 1987, pp. 1141-1176, vol. E20, No. 2.

International Search Report for PCT/JP2014/056372 dated Apr. 8, 2014 [PCT/ISA/210].

* cited by examiner

METHOD FOR PRODUCING CONDUCTIVE POLYMER-CONTAINING DISPERSION

CROSS REFERENCE TO RELATED APPLICATIONS

This application is a National Stage of International Application No. PCT/JP2014/056372 filed Mar. 11, 2014, claiming priority based on International Application No. PCT/JP2013/056680 filed Mar. 11, 2013, the contents of all of which are incorporated herein by reference in their entirety.

TECHNICAL FIELD

The present invention relates to a method for producing a conductive polymer-containing dispersion which is able to manufacture a conductive polymer-containing dispersion having excellent conductivity with excellent productivity without increasing viscosity during polymerization, and a conductive polymer-containing dispersion.

BACKGROUND ART

A conjugated conductive polymer has been used in a conductive coating material, an antistatic agent, an electromagnetic wave shielding material, a solid electrolyte, a transparent conductive material, a battery material, a capacitor material, a sensor material, a conductive adhesive agent, an electrophotographic material, a photosensitive member, a transfer member, and the like.

Polythiophene, polypyrrol, polyaniline, polyacethylene, polyphenylene, poly(p-phenylene-vinylene), polyacene, polythiophene vinylene, and the like have been known as the conjugated conductive polymer. In addition, a technology has been known in which the conjugated conductive polymer is doped by using a polyanion of polystyrene sulfonic acid or the like as a counter anion of the conjugated conductive polymer.

In addition, it has been known that PEDOT-PSS in which 3,4-ethylenedioxy thiophene (EDOT) is used in the conjugated conductive polymer monomer and polystyrene sulfonic acid (PSS) is used as the counter anion is an aqueous dispersion of a conductive polymer having excellent transparency, excellent stability, and excellent conductivity.

For example, in PTL 1 or PTL 2, a method for producing a conductive composition in which a monomer for obtaining a conjugated conductive polymer is subjected to an oxidation polymerization under the presence of a polyanion, and a method for producing a conductive composition in which a monomer for obtaining a conjugated conductive polymer is subjected to an oxidation polymerization under the presence of a polyanion and an organic sulfonic acid are disclosed. In addition, in PTL 3, a method for producing a conductive polymer composition in which an aqueous or a nonaqueous dispersion or solution including a polyanion and a monomer for obtaining a conjugated conductive polymer is irradiated with ultrasonic waves, and the monomer is polymerized is disclosed.

CITATION LIST

Patent Literature

[PTL 1] JP-A-2005-76016
[PTL 2] JP-A-7-90060
[PTL 3] JP-T-2011-510141

SUMMARY OF INVENTION

Technical Problem

However, the conductive polymer is easily aggregated in a dispersion medium, and the dispersion including the conductive polymer may have high viscosity at the time of reaction. The dispersion having high viscosity has a disadvantage for industrial handling. The dispersion including the conductive polymer having high viscosity requires a lot of energy for transporting the liquid at the time of mass production, and thus breakdown pressure is required for a device. Low viscosity of the dispersion having high viscosity is able to be achieved by using a disperser, but productivity decreases.

An object of the present invention is to provide a manufacturing method of a dispersion containing a conductive polymer having low viscosity in synthesis, excellent productivity, and excellent conductivity, and a conductive polymer-containing dispersion.

Solution to Problem

As a result of intensive studies of the present inventors, it has been found that the object of the present invention is able to be achieved by a method for producing a conductive polymer-containing dispersion using seed particles converted into a colloid protected by a polyanion.

That is, the present invention relates to the following 1 to 13.

1. A method for producing a conductive polymer-containing dispersion, including a polymerization step of polymerizing a monomer for obtaining a conjugated conductive polymer in a dispersion medium including the monomer and seed particles converted into a colloid protected by a polyanion.

2. The method for producing a conductive polymer-containing dispersion according to 1 described above, in which the seed particles are a polymer or a copolymer obtained by polymerizing an ethylenically unsaturated monomer.

3. The method for producing a conductive polymer-containing dispersion according to 1 or 2 described above, in which a particle diameter of d50 of the seed particles is 0.005 μm to 10 μm.

4. The method for producing a conductive polymer-containing dispersion according to any one of 1 to 3 described above, in which a dispersion of the seed particles converted into the colloid protected by the polyanion is further added during the polymerization step.

5. The method for producing a conductive polymer-containing dispersion according to any one of 1 to 4 described above, in which a dispersion treatment is performed with respect to the generated conjugated conductive polymer during the polymerization step.

6. The method for producing a conductive polymer-containing dispersion according to 5 described above, in which the dispersion treatment is performed by ultrasonic irradiation.

7. The method for producing a conductive polymer-containing dispersion according to any one of 1 to 6 described above, in which the monomer for obtaining a conjugated conductive polymer is at least one selected from pyrrol which may have a substituent group, aniline which may have a substituent group, and thiophene which may have a substituent group.

8. The method for producing a conductive polymer-containing dispersion according to 1 described above, in which a dispersion treatment is performed with respect to the generated conjugated conductive polymer by ultrasonic irradiation during the polymerization step.

9. The method for producing a conductive polymer-containing dispersion according to any one of 1 to 6, and 8 described above, in which the monomer for obtaining a conjugated conductive polymer includes a compound denoted by Formula (I) described below.

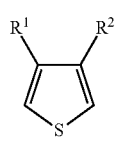

(I)

wherein in Formula (I), $R^1$ and $R^2$ each independently represent a hydrogen atom, a hydroxyl group, an alkyl group having carbon atoms of 1 to 18 which may have a substituent group, an alkoxy group having carbon atoms of 1 to 18 which may have a substituent group, or an alkylthio group having carbon atoms of 1 to 18 which may have a substituent group, and alternatively represent an alicyclic ring having carbon atoms of 3 to 10 which may have a substituent group, an aromatic ring having carbon atoms of 6 to 10 which may have a substituent group, an oxygen atom-containing heterocyclic ring having carbon atoms of 2 to 10 which may have a substituent group, a sulfur atom-containing heterocyclic ring having carbon atoms of 2 to 10 which may have a substituent group, or a sulfur atom and oxygen atom-containing heterocyclic ring having carbon atoms of 2 to 10 which may have a substituent group in which $R^1$ and $R^2$ are bonded to each other in order to form a ring.

10. The method for producing a conductive polymer-containing dispersion according to any one of 1 to 9 described above, in which the polyanion is a polymer having a sulfonic acid group.

11. The method for producing a conductive polymer-containing dispersion according to any one of 1 to 10 described above, in which an anion group in the polyanion is 0.25 mol to 30 mol with respect to 1 mol of the monomer for obtaining a conjugated conductive polymer.

12. The method for producing a conductive polymer-containing dispersion according to any one of 1 to 11 described above, in which the dispersion medium includes water, and the polymerization is performed by using at least one oxidation agent selected from a peroxodisulfuric acid and a salt thereof.

13. The method for producing a conductive polymer-containing dispersion according to 4 described above, in which the dispersion of the seed particles which are converted into the colloid protected by the polyanion is added for a time period 0.1 times to 2 times a time period until the polymerization of the monomer is completed during the polymerization step.

14. The method for producing a conductive polymer-containing dispersion according to 4 or 13 described above, in which the dispersion of the seed particles converted into the colloid protected by the polyanion is added by being dropped during the polymerization step.

15. The method for producing a conductive polymer-containing dispersion according to any one of 4, 13, and 15 described above, in which an added amount of the dispersion of the seed particles converted into the colloid protected by the polyanion during the polymerization is 10 mass % to 90 mass % with respect to a total amount of the dispersion medium.

16. The method for producing a conductive polymer-containing dispersion according to any one of 1 to 15 described above, in which the maximum value of the viscosity of the dispersion medium polymerizing the monomer is less than or equal to 5000 mPa·s.

17. A conductive polymer-containing dispersion obtained by the method for producing a conductive polymer-containing dispersion according to any one of 1 to 16 described above.

18. The conductive polymer-containing dispersion according to 17 described above, further including at least one electric conductivity improver selected from ethylene glycol, propylene glycol, and glycerin.

Advantageous Effects of Invention

According to the producing method of the present invention, it is possible to manufacture the dispersion having high conductivity and containing the conductive polymer formed of the conjugated conductive polymer and the seed particles converted into the colloid protected by the polyanion with excellent productivity without increasing the viscosity of the dispersion during the polymerization.

In addition, according to the present invention, it is possible to provide a conductive polymer-containing dispersion having excellent conductivity manufactured by the manufacturing method described above.

DESCRIPTION OF EMBODIMENTS

A method for producing a conductive polymer-containing dispersion of the present invention includes a step of polymerizing a monomer for obtaining a conjugated conductive polymer in a dispersion medium including the monomer and seed particles converted into a colloid protected by a polyanion.

[Conductive Polymer-Containing Dispersion]

A conductive polymer-containing dispersion of the present invention is a conductive polymer-containing dispersion in which a conductive polymer formed of a conjugated conductive polymer and seed particles converted into a colloid protected by a polyanion is dispersed in a dispersion medium.

The conductive polymer is a particulate polymer in which the polyanion is coordinated on the surface of the seed particles to be the protective colloid, and the polyanion on the surface of the seed particles is doped with the conjugated conductive polymer.

The polyanion of a dopant is coordinated on the seed particles, and thus it is possible to obtain a dispersion having low viscosity. Further, the polyanion is coordinated on the surface of the seed particles, and thus it is possible to coordinate the polyanion and the conjugated conductive polymer again, and conductivity is expressed.

[Conjugated Conductive Polymer]

(Conjugated Conductive Polymer)

The conjugated conductive polymer is not particularly limited insofar as the conjugated conductive polymer is an organic polymer of which a main chain is configured of a π-conjugation. The conjugated conductive polymer for example includes polypyrrols, polythiophenes, polyacethylenes, polyphenylenes, polyphenylene vinylenes, polyanilines, polyacenes, polythiophene vinylenes, a copolymer thereof, and the like. Among them, polypyrrols, polythiophenes, and polyanilines are preferable, and polythiophenes are more preferable. In addition, the conjugated conductive polymer having a substituent group such as alkyl group, a carboxyl group, a sulfonic acid group, an alkoxyl group, a hydroxyl group, a cyano group, and the like is preferable from a viewpoint of obtaining high conductivity.

In a specific example of the preferred conjugated conductive polymer, the polypyrrols include polypyrrol, poly(N-methyl pyrrol), poly(3-methyl pyrrol), poly(3-ethyl pyrrol), poly(3-n-propyl pyrrol), poly(3-butyl pyrrol), poly(3-octyl pyrrol), poly(3-decyl pyrrol), poly(3-dodecyl pyrrol), poly(3,4-dimethyl pyrrol), poly(3,4-dibutyl pyrrol), poly(3-carboxy pyrrol), poly(3-methyl-4-carboxy pyrrol), poly(3-methyl-4-carboxy ethyl pyrrol), poly(3-methyl-4-carboxy butyl pyrrol), poly(3-hydroxy pyrrol), poly(3-methoxy pyrrol), poly(3-ethoxy pyrrol), poly(3-butoxy pyrrol), poly(3-hexyl oxy pyrrol), poly(3-methyl-4-hexyl oxy pyrrol), poly(3-methyl-4-hexyl oxy pyrrol), and the like;

the polythiophenes include polythiophene, poly(3-methyl thiophene), poly(3-hexyl thiophene), poly(3-heptyl thiophene), poly(3-octyl thiophene), poly(3-decyl thiophene), poly(3-dodecyl thiophene), poly(3-octadecyl thiophene), poly(3-bromothiophene), poly(3-chlorothiophene), poly(3-iodine thiophene), poly(3-cyanothiophene), poly(3-phenyl thiophene), poly(3,4-dimethyl thiophene), poly(3,4-dibutyl thiophene), poly(3-hydroxy thiophene), poly(3-methoxy thiophene), poly(3-ethoxy thiophene), poly(3-butoxy thiophene), poly(3-hexyl oxy thiophene), poly(3-heptyl oxy thiophene), poly(3-octyl oxy thiophene), poly(3-decyl oxy thiophene), poly(3-dodecyl oxy thiophene), poly(3-octadecyl oxy thiophene), poly(3,4-dihydroxy thiophene), poly(3,4-dimethoxy thiophene), poly(3,4-diethoxy thiophene), poly(3,4-dipropoxy thiophene), poly(3,4-dibutoxy thiophene), poly(3,4-dihexyl oxy thiophene), poly(3,4-diheptyl oxy thiophene), poly(3,4-dioctyl oxy thiophene), poly(3,4-didecyl oxy thiophene), poly(3,4-didodecyl oxy thiophene), poly(3,4-ethylenedioxy thiophene), poly(3,4-propylene dioxy thiophene), poly(3,4-butylene dioxy thiophene), poly(3-methyl-4-methoxy thiophene), poly(3-methyl-4-ethoxy thiophene), poly(3-carboxy thiophene), poly(3-methyl-4-carboxy thiophene), poly(3-methyl-4-carboxy ethyl thiophene), poly(3-methyl-4-carboxy butyl thiophene), poly(3,4-ethylene oxy thiathiophene), and the like; and the polyanilines include polyaniline, poly(2-methyl aniline), poly(3-isobutyl aniline), poly(2-aniline sulfonate), poly(3-aniline sulfonate), and the like.

Among them, polypyrrol, polythiophene, poly(N-methyl pyrrol), poly(3-methyl thiophene), poly(3-methoxy thiophene), and poly(3,4-ethylenedioxy thiophene) are preferable from a viewpoint of high conductivity. In particular, poly(3,4-ethylenedioxy thiophene) [a popular name of PEDOT] is preferable from a viewpoint of higher conductivity and excellent heat resistance.

One of the materials is able to be independently used, or a combination of two or more thereof is able to be used as the conjugated conductive polymer.

(Monomer)

At least one selected from pyrrol which may have a substituent group, aniline which may have a substituent group, and thiophene which may have a substituent group is preferably used as the monomer for obtaining a conjugated conductive polymer. The substituent group for example include an alkyl group having carbon atoms of 1 to 18, an aryl group having carbon atoms of 6 to 10, a heteroaryl group having carbon atoms of 5 to 10, an alkoxy group having carbon atoms of 1 to 18, an alkylthio group having carbon atoms of 1 to 18, a carboxyl group, a hydroxyl group, a halogen atom, and a cyano group. Furthermore, the alkyl group, the aryl group, the heteroaryl group, the alkoxy group, and the alkylthio group described above may be substituted with a carboxyl group, a hydroxyl group, a halogen atom, or a cyano group. In addition, a ring may be formed by condensing two or more substituent groups.

A specific example of the monomer described above includes pyrrol, N-methyl pyrrol, 3-methyl pyrrol, 3-ethyl pyrrol, 3-n-propyl pyrrol, 3-butyl pyrrol, 3-octyl pyrrol, 3-decyl pyrrol, 3-dodecyl pyrrol, 3,4-dimethyl pyrrol, 3,4-dibutyl pyrrol, 3-carboxyl pyrrol, 3-methyl-4-carboxyl pyrrol, 3-methyl-4-carboxy ethyl pyrrol, 3-methyl-4-carboxy butyl pyrrol, 3-hydroxy pyrrol, 3-methoxy pyrrol, 3-ethoxy pyrrol, 3-butoxy pyrrol, 3-hexyl oxy pyrrol, 3-methyl-4-hexyl oxy pyrrol, and 3-methyl-4-hexyl oxy pyrrol;

thiophene, 3-methyl thiophene, 3-ethyl thiophene, 3-propyl thiophene, 3-butyl thiophene, 3-hexyl thiophene, 3-heptyl thiophene, 3-octyl thiophene, 3-decyl thiophene, 3-dodecyl thiophene, 3-octadecyl thiophene, 3-bromothiophene, 3-chlorothiophene, 3-iodine thiophene, 3-cyanothiophene, 3-phenyl thiophene, 3,4-dimethyl thiophene, 3,4-dibutyl thiophene, 3-hydroxy thiophene, 3-methoxy thiophene, 3-ethoxy thiophene, 3-butoxy thiophene, 3-hexyl oxy thiophene, 3-heptyl oxy thiophene, 3-octyl oxy thiophene, 3-decyl oxy thiophene, 3-dodecyl oxy thiophene, 3-octadecyl oxy thiophene, 3,4-dihydroxy thiophene, 3,4-dimethoxy thiophene, 3,4-diethoxy thiophene, 3,4-dipropoxy thiophene, 3,4-dibutoxy thiophene, 3,4-dihexyl oxy thiophene, 3,4-diheptyl oxy thiophene, 3,4-dioctyl oxy thiophene, 3,4-didecyl oxy thiophene, 3,4-didodecyl oxy thiophene, 3,4-ethylenedioxy thiophene, 3,4-propylene dioxy thiophene, 3,4-butylene dioxy thiophene, 3-methyl-4-methoxy thiophene, 3-methyl-4-ethoxy thiophene, 3-carboxy thiophene, 3-methyl-4-carboxy thiophene, 3-methyl-4-carboxy ethyl thiophene, 3-methyl-4-carboxy butyl thiophene, and 3,4-ethylene oxy thiathiophene; and aniline, 2-methyl aniline, 3-isobutyl aniline, 2-aniline sulfonate, 3-aniline sulfonate, and the like.

One of the materials is able to be independently used, or a combination of two or more thereof is able to be used as the monomer for obtaining a conjugated conductive polymer.

Among them, as the monomer for obtaining a conjugated conductive polymer, it is preferable to include a compound denoted by Formula (I) described later, it is more preferable to include a compound denoted by Formula (II) described later, and it is further preferable to include 3,4-ethylenedioxy thiophene.

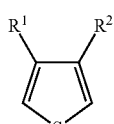

(I)

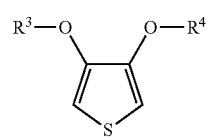

(II)

In Formula (I) described above, $R^1$ and $R^2$ each independently represent a hydrogen atom, a hydroxyl group, an alkyl group having carbon atoms of 1 to 18 which may have a substituent group, an alkoxy group having carbon atoms of 1 to 18 which may have a substituent group, or an alkylthio group having carbon atoms of 1 to 18 which may have a substituent group, or an alicyclic ring having carbon atoms of 3 to 10 which may have a substituent group, an aromatic ring having carbon atoms of 6 to 10 which may have a substituent group, an oxygen atom-containing heterocyclic ring having carbon atoms of 2 to 10 which may have a substituent group, a sulfur atom-containing heterocyclic ring having carbon atoms of 2 to 10 which may have a substituent group, or a sulfur atom and an oxygen atom-containing heterocyclic ring having carbon atoms of 2 to 10, which may have a substituent group in which $R^1$ and $R^2$ are bonded to each other in order to form a ring. The substituent group for example includes an alkyl group having carbon atoms of 1 to 18, an aryl group having carbon atoms of 6 to 10, a heteroaryl group having carbon atoms of 5 to 10, an alkoxy group having carbon atoms of 1 to 18, an alkylthio group having carbon atoms of 1 to 18, a carboxyl group, a hydroxyl group, a halogen atom, and a cyano group. Furthermore, the alkyl group, the aryl group, the heteroaryl group, the alkoxy group, and the alkylthio group described above may be substituted with a carboxyl group, a hydroxyl group, a halogen atom, or a cyano group. In addition, a ring may be formed by condensing two or more substituent groups.

The oxygen atom-containing heterocyclic ring described above includes an oxirane ring, an oxetane ring, a furane ring, a hydrofurane ring, a pyrane ring, a pyrone ring, a dioxane ring, a trioxane ring, and the like.

The sulfur atom-containing heterocyclic ring described above includes a thiirane ring, a thietane ring, a thiophene ring, a thiane ring, a thiopyrane ring, a thiopyrylium ring, a benzothiopyrane ring, a dithiane ring, a dithiolane ring, a trithiane ring, and the like.

The sulfur atom and the oxygen atom-containing heterocyclic ring described above includes an oxathiolane ring, an oxathiane ring, and the like.

$R^3$ and $R^4$ each independently represent a hydrogen atom or an alkyl group having carbon atoms of 1 to 4 which may have a substituent group, or an oxygen atom-containing heterocyclic ring having carbon atoms of 3 to 6 which may have a substituent group in which $R^3$ and $R^4$ are bonded to each other in order to form a ring, in Formula (II) described above.

Preferably, $R^3$ and $R^4$ are an oxygen atom-containing heterocyclic ring having carbon atoms of 3 to 6 which may have a substituent group in which $R^3$ and $R^4$ are bonded to each other in order to form a ring. The oxygen atom-containing heterocyclic ring described above includes a dioxane ring, a trioxane ring, and the like, and the dioxane ring is preferable. The substituent group for example includes an alkyl group having carbon atoms of 1 to 18, an aryl group having carbon atoms of 6 to 10, a heteroaryl group having carbon atoms of 5 to 10, an alkoxy group having carbon atoms of 1 to 18, an alkylthio group having carbon atoms of 1 to 18, a carboxyl group, a hydroxyl group, a halogen atom, and a cyano group. Furthermore, the alkyl group, the aryl group, the heteroaryl group, the alkoxy group, and the alkylthio group described above may be substituted with a carboxyl group, a hydroxyl group, a halogen atom, or a cyano group. In addition, a ring may be formed by condensing two or more substituent groups.

[Seed Particles Converted into Protected Colloid]
(Seed Particles)

The seed particles used in the present invention may be seed particles converted into the colloid protected by the polyanion in the dispersion medium, and a preferred example includes polymer or copolymer particles which are obtained by polymerizing an ethylenically unsaturated monomer. A particle diameter of d50 of the seed particles dispersed in the dispersion medium (a median diameter of 50% on a volume basis) is preferably 0.005 μm to 10 μm, is more preferably 0.02 μm to 2 μm, and is further preferably 0.05 μm to 1 μm. A particle diameter distribution of the seed particles is able to be measured by a Microtrack UPA-type particle size distribution measurement device manufactured by Nikkiso Co., Ltd.

The ethylenically unsaturated monomer may be an ethylenically unsaturated monomer having at least one polymerizable vinyl group, and for example includes an aromatic vinyl compound such as (meth)acrylic esters having a linear, a branched, or a cyclic alkyl chain (for example, methyl methacrylate, t-butyl methacrylate, and the like), an aromatic vinyl compound such as styrene, and α-methyl styrene, a heterocyclic vinyl compound such as vinyl pyrrolidone, hydroxy alkyl(meth)acrylate, dialkyl aminoalkyl (meth)acrylate, vinyl esters represented by acetic acid vinyl or alkanoic acid vinyl, monoolefines (ethylene, propylene, butylene, isobutylene, and the like), conjugated diolefines (butadiene, isoprene, chloroprene, and the like), α,β-unsaturated mono or dicarboxylic acid (acrylic acid, methacrylic acid, crotonic acid, itaconic acid, maleic acid, fumaric acid, and the like), a vinyl cyanide compound such as acrylonitrile, and a carbonyl group-containing ethylenically unsaturated monomer such as acrolein or diacetone acrylamide. One of the materials may be independently used, or a combination of two or more thereof may be used as the ethylenically unsaturated monomer. In addition, styrene is preferably used among the aromatic vinyl compounds.

In addition, as necessary, an epoxy group-containing α,β-ethylenically unsaturated compound such as glycidyl (meth)acrylate, a hydrolyzable alkoxy silyl group-containing α,β-ethylenically unsaturated compound such as vinyl triethoxy silane or γ-methacryloxy propyl trimethoxy silane, and a cross-linking monomer such as a multifunctional vinyl compound (ethylene glycol di(meth)acrylate, trimethylol propane tri(meth)acrylate, allyl(meth)acrylate, divinyl benzene, diallyl phthalate, and the like) may be introduced to a polymer or a copolymer, and may be cross-linked to each other or may be cross-linked by combining an ethylenically unsaturated compound component having an active hydrogen group, or a cross-linking monomer such as a carbonyl group-containing α,β-ethylenically unsaturated compound (particularly limited to a keto group-containing compound) or the like may be introduced to a polymer or a copolymer, and may be cross-linked by combining a polyhydrazine compound (in particular, a compound having two or more hydrazide groups; oxalic acid dihydrazide, succinic acid dihydrazide, adipic acid dihydrazide, polyacrylic acid hydrazide, and the like). Thus, by introducing the cross-linking monomer to the polymer or the copolymer, it is possible to improve the water resistance, humidity resistance, and heat resistance of the conductive polymer. A ratio of the cross-linking monomer to be introduced is preferably less than or equal to 50%, is more preferably less than or equal to 35%, and is further preferably less than or equal to 25%, with respect to the polymer or the copolymer.

(Polyanion)

The polyanion used in the present invention is a polymer having an anionic group. The anionic group includes a group formed of a sulfonic acid or a salt thereof, a group formed of a phosphoric acid or a salt thereof, a monosubstituted phosphoric acid ester group, a group formed of a carboxylic acid or a salt thereof, a monosubstituted sulfuric acid ester group, and the like. Among them, a strong acidic group is preferable, the group formed of a sulfonic acid or a salt thereof, and the group formed of a phosphoric acid or a salt thereof are more preferable, and the group formed of a sulfonic acid or a salt thereof are further preferable. The anionic group may be directly bonded to a polymer main chain, or may be bonded to a side chain. When the anionic group is bonded to the side chain, a doping effect is more remarkably obtained, and thus it is preferable that the anionic group is bonded to a terminal of the side chain.

The polyanion may have a substituent group other than the anionic group. The substituent group includes an alkyl group, a hydroxy group, an alkoxy group, a phenol group, a cyano group, a phenyl group, a hydroxy phenyl group, an ester group, a halogeno group, an alkenyl group, an imide group, an amide group, an amino group, an oxy carbonyl group, a carbonyl group, and the like. Among them, the alkyl group, the hydroxy group, the cyano group, the phenol group, and the oxy carbonyl group are preferable, and the alkyl group, the hydroxy group, and the cyano group are more preferable. The substituent group described above may be directly bonded to the polymer main chain, or may be bonded to the side chain. When the substituent group is bonded to the side chain, a function of each of the substituent groups is obtained, and thus it is preferable that the substituent group is bonded to the terminal of the side chain.

The alkyl group which is able to be substituted in the polyanion is able to be expected to have a function of increasing solubility and dispersibility with respect to the dispersion medium, compatibility and dispersibility with respect to the conjugated conductive polymer, and the like. The alkyl group includes a chained alkyl group such as a methyl group, an ethyl group, a propyl group, a butyl group, an isobutyl group, a t-butyl group, a pentyl group, a hexyl group, an octyl group, a decyl group, and a dodecyl group; and a cycloalkyl group such as a cyclopropyl group, a cyclopentyl group, and a cyclohexyl group. In consideration of solubility with respect to the dispersion medium, dispersibility with respect to the conjugated conductive polymer, a steric barrier, and the like, an alkyl group having carbon atoms of 1 to 12 is preferable.

The hydroxy group which is able to be substituted in the polyanion is able to be expected to have a function of easily forming a hydrogen bond with the other hydrogen atom, and of increasing solubility with respect to the dispersion medium, and compatibility, dispersibility, and adhesiveness with respect to the conjugated conductive polymer. It is preferable that the hydroxy group is bonded to a terminal of an alkyl group having carbon atoms of 1 to 6 bonded to the polymer main chain.

The cyano group and the hydroxy phenyl group which are able to be substituted in the polyanion are able to be expected to have a function of increasing compatibility with respect to the conjugated conductive polymer, solubility, and heat resistance with respect to the dispersion medium. It is preferable that the cyano group is directly bonded to the polymer main chain, is bonded to a terminal of an alkyl group having carbon atoms of 1 to 7 bonded to the polymer main chain, and is bonded to a terminal of an alkenyl group having carbon atoms of 2 to 7 bonded to the polymer main chain.

It is preferable that the oxy carbonyl group which is able to be substituted in the polyanion is an alkyl oxy carbonyl group, an aryl oxy carbonyl group, and an alkyl oxy carbonyl group or an aryl oxy carbonyl group formed through the other functional groups directly bonded to the polymer main chain.

The polymer main chain of the polyanion is not particularly limited. The polymer main chain for example includes polyalkylene, polyimide, polyamide, polyester, and the like. Among them, polyalkylene is preferable from a viewpoint of synthesis or accessibility.

The polyalkylene is a polymer configured of a repeating unit of an ethylenically unsaturated monomer. The polyalkylene may have a carbon-carbon double bond in a main chain. The polyalkylene for example includes polyethylene, polypropylene, polybutene, polypentene, polyhexene, polyvinyl alcohol, polyvinyl phenol, poly(3,3,3-trifluoropropylene), polyacrylonitrile, polyacrylate, polymethacrylate, polystyrene, polybutadiene, polyisoprene, and the like.

As the polyimide, a polyimide which is able to be obtained by a polycondensation reaction between an acid anhydride such as pyromellitic acid dianhydride, biphenyl tetracarboxylic acid dianhydride, benzophenone tetracarboxylic acid dianhydride, 2,2,3,3-tetracarboxy diphenyl ether dianhydride, and 2,2-[4,4'-di(dicarboxy phenyl oxy) phenyl]propane dianhydride, and diamine such as oxy dianiline, paraphenylene diamine, methaphenylene diamine, and benzophenone diamine.

The polyamide, polyamide 6 includes polyamide 6,6, polyamide 6,10, and the like.

The polyester includes polyethylene terephthalate, polybutylene terephthalate, and the like.

A specific example of a polymer having a sulfonic acid group preferably used as the polyanion includes a polyvinyl sulfonic acid, a polystyrene sulfonic acid, a polyallyl sulfonic acid, a polyacrylic ethyl sulfonic acid, a polyacrylic butyl sulfonic acid, a poly(2-acrylamide-2-methyl propane sulfonic acid), a polyisoprene sulfonic acid, and the like. One of the materials may be independently used, or a combination of two or more thereof may be used. Among them, from a viewpoint of imparting conductivity, the polystyrene sulfonic acid, the polyisoprene sulfonic acid, the polyacrylic ethyl sulfonic acid, and the polyacrylic butyl sulfonic acid are preferable, and the polystyrene sulfonic acid [a popular name of PSS] is more preferable.

The polyanion, in particular, the polymer having a sulfonic acid group is able to relax thermal decomposition of the conjugated conductive polymer, improves dispersibility of the monomer for obtaining a conjugated conductive polymer in the dispersion medium, and functions as a dopant of the conjugated conductive polymer.

The weight-average molecular weight of the polyanion used in the present invention is preferably 1,000 to 1,000,000, is more preferably 5,000 to 500,000, and is further preferably 10,000 to 300,000. When the weight-average molecular weight is in this range, solubility of the polyanion with respect to the dispersion medium, and compatibility between the polyanion and the conjugated conductive polymer become excellent. The weight-average molecular weight is measured as a molecular weight in terms of polystyrene by using gel permeation chromatography.

The polyanion may be a polyanion having the properties described above and selected from commercialized products, or may be a polyanion obtained by synthesis using a known method. A synthesis method of the polyanion for example includes a method disclosed in Houben-Weyl, "Methoden derorganischen Chemle" Vol. E20, Makromolekulare Stoffe, No. 2 (1987) p 1141, a method disclosed in PTL 1 to PTL 3, and the like.

In the total amount of the polyanion used for converting the seed particles into the protected colloid and the polyanion prepared in advance before starting the polymerization or the polyanion added during the polymerization, an anionic group of the polyanion is preferably 0.25 mol to 30 mol, is more preferably 0.8 mol to 25 mol, and is further preferably 1 mol to 20 mol with respect to 1 mol of the monomer for obtaining a conjugated conductive polymer.

In addition, the amount of the polyanion used with respect to 100 parts by mass of the conjugated conductive polymer in the producing method of the present invention is preferably 10 parts by mass to 30,000 parts by mass, is more preferably 50 parts by mass to 25,000 parts by mass, and is further preferably 100 parts by mass to 20,000 parts by mass.

When the amount of the polyanion used excessively increases, conductivity of the conductive polymer tends to be decreased, and when the amount of the polyanion used excessively decreases, dispersibility of the conductive polymer in the dispersion medium tends to be decreased.

Furthermore, when the polyanion is used in a hole injection layer of an electroluminescent device, it is possible to increase the amount of the polyanion used with respect to the conjugated conductive polymer in the producing method of the present invention in order to improve luminance efficiency.

(Manufacturing of Seed Particles Converted into Protected Colloid)

The seed particles are converted into the colloid protected by the polyanion in the dispersion medium, and the dispersion of the seed particles converted into the protective protected colloid dispersed in the dispersion medium is able to be manufactured as a resin emulsion.

The polymerization reaction of the resin emulsion is a radical polymerization reaction, and is performed by any one of a batch-type method, a semicontinuous method, and a continuous method using a normal pressure reactor or a breakdown pressure reactor. In addition, it is preferable to perform the polymerization by dissolving, emulsifying, or dispersing each of the ethylenically unsaturated monomer and the polyanion in the dispersion medium in advance, and by continuously or intermittently adding an ethylenically unsaturated monomer solution to a polyanion-containing liquid from a viewpoint of reaction stability or homogeneity of the polymer at the time of the polymerization.

In general, a reaction temperature is 10° C. to 100° C., and is usually 30° C. to 90° C. A reaction time is not particularly limited, and may be suitably adjusted according to the amount of each component used, the type of a polymerization initiator, the reaction temperature, and the like.

At the time of the radical polymerization, the polyanion of the protective colloid contributes to stability of emulsion particles, as necessary, an emulsifying agent such as an anionic emulsifying agent, a nonionic emulsifying agent, and a reactive emulsifying agent, aliphatic amine, and the like may be added into a polymerization system. The type or the amount of the emulsifying agent and the aliphatic amine used may be suitably adjusted according to various conditions commencing with, the amount of the polyanion used, and the composition of the ethylenically unsaturated monomer.

As the emulsifying agent used in such a radical polymerization reaction, for example, an anionic emulsifying agent such as an alkyl sulfuric acid ester salt, an alkyl benzene sulfonic acid salt, an alkyl sulfosuccinic acid salt, an alkyl diphenyl ether disulfonic acid salt, a polyoxy alkylene alkyl sulfuric acid salt, and a polyoxy alkylene alkyl phosphoric acid ester, and a nonionic surfactant agent such as polyoxy alkylene alkyl ether, polyoxy alkylene alkyl phenol ether, polyoxy alkylene fatty acid ester, and polyoxy alkylene sorbitan fatty acid ester are included.

The aliphatic amine includes primary amine such as octyl amine, lauryl amine, myristyl amine, stearyl amine, and oleyl amine, secondary amine such as dioctyl amine, dilauryl amine, distearyl amine, and dioleyl amine, tertiary amine such as N,N-dimethyl lauryl amine, N,N-dimethyl myristyl amine, N,N-dimethyl palmityl amine, N,N-dimethyl stearyl amine, N,N-dimethyl behenyl amine, N,N-dimethyl oleyl amine, N-methyl didecyl amine, and N-methyl dioleyl amine, and the like.

As the emulsifying agent and the aliphatic amine, one of the materials may be independently used, or a combination of two or more thereof may be used.

In addition, a water soluble polymer such as polyvinyl alcohol, methyl cellulose, carboxy methyl cellulose, hydroxy ethyl cellulose, hydroxy propyl cellulose, and polyvinyl pyrrolidone may be used together within a range which does not impair the properties of the obtained conductive polymer.

The dispersion medium is an aqueous medium, and the dispersion medium includes water, or a mixed solvent of water and a water soluble solvent. A ratio of the water soluble solvent in the mixed solvent is preferably 0 mass % to 30 mass %. When the ratio of the water soluble solvent exceeds 30 mass %, polymerization stability of synthetic resin emulsion tends to be considerably decreased. The water soluble solvent includes alcohols such as methanol, ethanol, and isopropyl alcohol, ketones such as acetone, glycols such as ethylene glycol, and propylene glycol, ethers such as ethylene glycol monomethyl ether, and ethylene glycol monobutyl ether, and the like.

As the polymerization initiator used at the time of the radical polymerization, a commonly known polymerization initiator is able to be used. The polymerization initiator, for example, includes inorganic peroxides such as hydrogen peroxide, persulfate, ammonium persulfate, potassium persulfate, and sodium persulfate; organic peroxides such as benzoyl peroxide, and t-butyl hydroperoxide, and azo compounds such as 2,2'-azobisisobutyronitrile, and 4,4'-azobis (4-cyanovaleric acid). In addition, as necessary, these polymerization initiators may be subjected to a redox polymerization by combining sodium sulfoxylate formaldehyde, ascorbic acid, sulfites, tartaric acid or salts thereof, iron (II) sulfate, and the like. In addition, as necessary, a chain transfer agent such as alcohols, mercaptans may be used.

In addition, the amount of the ethylenically unsaturated monomer used with respect to 100 parts by mass of the amount of the polyanion used in the manufacturing of the seed particles converted into the protected colloid is preferably 10 parts by mass to 100 parts by mass, is more preferably 20 parts by mass to 90 parts by mass, and is further preferably 10 parts by mass to 60 parts by mass. When the amount of the ethylenically unsaturated monomer used is less than 10 parts by mass, a ratio of the conductive polymer including the seed particles converted into the colloid protected by the polyanion to the conjugated conductive polymer decreases, and it is difficult to obtain an effect of suppressing thickening at the time of the polymerization. When the amount used exceeds 100 parts by mass, stability of the seed particles converted into the protected colloid decreases.

[Method for Producing Conductive Polymer-Containing Dispersion]

The producing method of the present invention includes a step of polymerizing the monomer for obtaining a conjugated conductive polymer. The polymerization step is performed in the dispersion medium including monomer for obtaining a conjugated conductive polymer, and the seed particles converted into the colloid protected by the polyanion.

(Viscosity of Dispersion During Polymerization)

The maximum value of the viscosity of the dispersion during the polymerization, is preferably less than or equal to 5,000 mPa·s, is more preferably less than or equal to 4,500 mPa·s, and is further preferably less than or equal to 4,000 mPa·s. When the maximum value of the viscosity of the dispersion during the polymerization is less than or equal to 5,000 mPa·s, industrial handling becomes easy, and it is possible to reduce the energy required for transporting the liquid at the time of mass production. Furthermore, the viscosity of the dispersion during the polymerization is a value measured at 25° C. by using a No. 2 rotor in a B-type viscosimeter.

(Monomer Solution)

In order to polymerize the monomer for obtaining a conjugated conductive polymer in the dispersion medium, the monomer, the dispersion (the resin emulsion) of the seed particles converted into the colloid protected by the polyanion, and, as necessary, an additive agent are added to the dispersion medium, and a dispersion including the monomer and the seed particles converted into the protected colloid (hereinafter, simply referred to as a "monomer solution") is obtained.

The monomer solution described above may be prepared by a stirring device using shear force or cavitation which is able to perform emulsification and dispersion. The stirring device includes an ultrahigh pressure homogenizer, a high pressure homogenizer, a low pressure homogenizer, a homomixer, a high shear mixer, a disper, a ball mill, an ultrasonic device, and a supercritical device. A static fluid mixer such as a Ramond nano mixer (trademark registration) not provided with a driving unit may be included. It is preferable that the monomer solution is prepared by ultrasonic irradiation. Ultrasonic irradiation energy is not particularly limited insofar as a homogeneous monomer solution is obtained. It is preferable that ultrasonic irradiation is performed at consumed power of 5 W/L (liter) to 500 W/L (liter) for an irradiation time of 0.1 hours/L (liter) to 2 hours/L (liter). Furthermore, the monomer solution may be prepared by a strong emulsification and dispersion device such as a high shear mixer (for example, Magic Lab, Crea Mix, Milder, Cavitron, and the like) instead of the ultrasonic irradiation, or along with the ultrasonic irradiation.

In addition, the polyanion is able to be further included in the dispersion including the monomer for obtaining a conjugated conductive polymer before starting the polymerization, and the seed particles converted into the colloid protected by the polyanion in addition to the dispersion of the seed particles converted into the protected colloid from a viewpoint of suppressing aggregation of the conjugated conductive polymer generated during the polymerization.

The polyanion described above is added to the monomer solution, is dissolved, and is emulsified or dispersed, and thus is included in the monomer solution. When the polyanion is included in the monomer solution in addition to the dispersion of the seed particles converted into the protected colloid, the amount before starting the polymerization is preferably 5 mass % to 99 mass %, is more preferably 10 mass % to 90 mass %, and is further preferably 20 mass % to 80 mass % of the total amount of the used polyanion excluding the protected colloid of the seed particles.

(Dispersion Medium)

The dispersion medium used in the polymerization of the monomer is not particularly limited insofar as the conductive polymer formed of the conjugated conductive polymer, and the seed particles converted into the colloid protected by the polyanion is able to be dispersed, and it is preferable that a dispersion medium is identical to that used in the dispersion of the seed particles.

The dispersion medium for example includes water; amides such as N-vinyl pyrrolidone, hexamethyl phosphortriamide, N-vinyl formamide, and N-vinyl acetamide; phenols such as cresol, phenol, and xylenol; polyvalent alcohols such as dipropylene glycol, 1,3-butylene glycol, 1,4-butylene glycol, diglycerin, isoprene glycol, butanediol, 1,5-pentanediol, 1,6-hexanediol, 1,9-nonanediol, and neopentyl glycol; a carbonate compound such as ethylene carbonate, and propylene carbonate; ethers such as dioxane, diethyl ether, propylene glycol dialkyl ether, polyethylene glycol dialkyl ether, and polypropylene glycol dialkyl ether; a heterocyclic ring compound such as 3-methyl-2-oxazolidinone; nitriles such as acetonitrile, glutarodinitrile, methoxy acetonitrile, propionitrile, and benzonitrile, and the like.

As the solvent, one of the materials is able to be independently used, or a combination of two or more thereof is able to be used. Among them, a dispersion medium including water of 1 mass % to 99 mass % is preferably used, and a dispersion medium including water of 50 mass % to 99 mass % is more preferably used, and a dispersion medium independently including water is further preferably used.

The amount of the dispersion medium used is preferably 10 parts by mass to 100,000 parts by mass, is more preferably 100 parts by mass to 50,000 parts by mass, and is further preferably 300 parts by mass to 20,000 parts by mass, with respect to the sum total of 100 parts by mass of the monomer for obtaining a conjugated conductive polymer and the seed particles converted into the colloid protected by the polyanion. When the amount of the dispersion medium used excessively decreases, the viscosity of the dispersion tends to be increased. When the amount of the dispersion medium used excessively increases, production efficiency of the products such as a film using the dispersion of the present invention tends to be decreased due to time spent on an operation for removing the dispersion medium from the dispersion.

(Oxidation Agent)

In the polymerization of the monomer, for example, when a dispersion including polypyrrols or polythiophenes as the conjugated conductive polymer is manufactured, the polymerization is started at a predetermined temperature in the presence of an oxidation agent.

The oxidation agent includes a persulfuric acid, and a persulfuric acid salt such as ammonium persulfate, potassium persulfate, and sodium persulfate; a metal halogen compound such as boron trifluoride; a transition metal compound such as ferric chloride, ferric sulfate, and cupric chloride; a metal oxide such as silver oxide, and cesium oxide; peroxide such as hydrogen peroxide, and ozone; organic peroxide such as benzoyl peroxide; oxygen, and the like. Among them, the persulfuric acid and the persulfuric acid salt are preferable, and the persulfuric acid salt is more preferable. One of the materials is able to be independently used, or a combination of two or more thereof is able to be used as the oxidation agent.

(Polymerization Temperature)

The polymerization temperature in the polymerization of the monomer is usually 0° C. to 100° C., is preferably 5° C. to 80° C., is more preferably 10° C. to 60° C., and is further preferably 15° C. to 40° C.

When the polymerization temperature is in the range described above, it is possible to perform the polymerization at a suitable reaction velocity, it is possible to suppress an increase in the polymerization viscosity, it is possible to stably manufacture the dispersion including the conductive polymer within an economical time period, and electric conductivity of the conductive polymer to be obtained tends to be increased. The polymerization temperature is able to be managed by using a known heater or a known cooler. In addition, as necessary, the polymerization may be performed by changing the temperature within the range described above.

(Dispersion Treatment)

In the method for producing a conductive polymer-containing dispersion of the present invention, it is preferable that a dispersion treatment with respect to the conjugated conductive polymer to be generated during the polymerization step is further included.

The dispersion treatment may be performed by a stirring device using shear force or cavitation which is able to perform emulsification and dispersion. The stirring device includes an ultrahigh pressure homogenizer, a high pressure homogenizer, a low pressure homogenizer, a homomixer, a high shear mixer, a disper, a ball mill, an ultrasonic device, and a supercritical device. A static fluid mixer such as a Ramond nano mixer (trademark registration) not provided with a driving unit may be included. It is preferable that the dispersion treatment is performed by ultrasonic irradiation. According to the dispersion treatment, it is possible to suppress aggregation of the conjugated conductive polymer having a long main chain. Ultrasonic irradiation energy is not particularly limited insofar as the aggregation of the conjugated conductive polymer is able to be suppressed. It is preferable that the ultrasonic irradiation is performed at a consumed power of 5 W/L to 500 W/L until the reaction ends.

(Addition of Dispersion of Seed Particles)

In addition, it is preferable that during the polymerization step of the monomer, dispersion of the seed particles converted into the colloid protected by the polyanion is further added. A part of a predetermined amount of the dispersion of the seed particles converted into the protected colloid is further added during the polymerization step, and thus it is possible to suppress thickening of the reaction solution at the time of the polymerization, and it is possible to improve stirring and mixing efficiency or to reduce a load to a manufacturing device.

The amount of the dispersion of the seed particles converted into the protected colloid added during the polymerization is preferably 10 mass % to 90 mass %, and is more preferably 20 mass % to 70 mass % of the total amount of the used dispersion of the seed particles converted into the protected colloid.

"During the polymerization step of the monomer" is a time period from a time when the polymerization of the monomer is started to a time when the polymerization of the monomer ends in the dispersion medium including the monomer for obtaining a conjugated conductive polymer and the seed particles converted into the colloid protected by the polyanion. For example, when the oxidation agent is added to the dispersion medium described above as the polymerization initiator, "during the polymerization step of the monomer" is a time period from a time when the oxidation agent is added to the dispersion medium to a time when the polymerization of the monomer is completed. The polymerization is completed when a residual ratio of the monomer for obtaining a conjugated conductive polymer is less than or equal to 10%.

The dispersion of the seed particles converted into the colloid protected by the polyanion may be added for a predetermined time period during the polymerization step of the monomer. The dispersion including the seed particles during the polymerization of the monomer gradually increases with the lapse of time, and thus when the viscosity of the dispersion including the seed particles during the polymerization of the monomer decreases, the added amount of the seed particles added to the dispersion decreases, and when the viscosity of the dispersion including the seed particles during the polymerization of the monomer increases, the added amount of the seed particles added to the dispersion increases. Accordingly, it is possible to suitably decrease the viscosity of the dispersion including the seed particles during the polymerization of the monomer. A time period during which the dispersion of the seed particles is added is preferably a time period 0.01 times to 4 times a time period until the polymerization of the monomer is completed, is more preferably a time period 0.1 times to 2 times a time period until the polymerization of the monomer is completed, and is further preferably a time period 0.25 times to 1.5 times a time period until the polymerization of the monomer is completed. In addition, the dispersion of the seed particles may be continuously added, or may be intermittently added. Further, the dispersion of the seed particles may be started to be added along with the start of the polymerization, or may be started to be added after the lapse of a predetermined time period after the polymerization is started. In addition, when the viscosity of the dispersion during the polymerization is a value greater than or equal to 1.1 times with respect to a time point of starting the reaction, the dispersion of the seed particles may be started to be added. Accordingly, when the viscosity of the dispersion including the seed particles during the polymerization of the monomer increases, the dispersion of the seed particles is added, and thus it is possible to effectively decrease the viscosity of the dispersion including the seed particles during the polymerization of the monomer.

The addition rate of the dispersion of the seed particles may be constant. In addition, in order to suitably decrease the viscosity of the dispersion including the seed particles during the polymerization of the monomer by gradually adding the dispersion of the seed particles to the dispersion medium of the seed particles during the polymerization, the dispersion of the seed particles may be dropped in the dispersion including the seed particles during the polymerization of the monomer. Accordingly, it is possible to add the dispersion of the seed particles added during the polymerization step of the monomer while homogeneously dispersing the dispersion of the seed particles in the dispersion medium during the polymerization. Further, the addition rate of the dispersion of the seed particles may be changed according to the viscosity of the dispersion during the polymerization. Accordingly, when the viscosity of the dispersion during the polymerization increases, it is possible to increase the addition rate of the dispersion of the seed particles, and thus it is possible to effectively decrease the viscosity of the dispersion of a target to be added.

An average addition rate of the added dispersion of the seed particles converted into the colloid protected by the polyanion during the polymerization step of the monomer is preferably 10 g/hr to 200 g/hr, is more preferably 20 g/hr to 100 g/hr, and is further preferably 40 g/hr to 80 g/hr, per 100 g of the monomer.

The seed particles of the dispersion added during the polymerization step of the monomer may be different from the seed particles of the dispersion medium of a target to be added. Accordingly, it is possible to select the seed particles which are able to effectively reduce the viscosity of the dispersion medium during the polymerization at the time of being added during the polymerization step of the monomer.

(Addition of Polyanion)

In addition, the polyanion used for converting the seed particles into the protected colloid may be further added during the polymerization step of the monomer. By further adding a part of a predetermined amount of the polyanion during the polymerization step, it is possible to suppress thickening of the reaction solution at the time of the polymerization, and it is possible to improve stirring and mixing efficiency or to reduce a load to the manufacturing device.

When the polyanion is added during the polymerization, the amount of the polyanion to be used is preferably 5 mass % to 90 mass %, and is more preferably 20 mass % to 70 mass %, with respect to the total amount of the polyanion to be used.

(Additive Agent)

An additive agent is able to be added to the monomer solution used in the producing method of the present invention or the conductive polymer-containing dispersion obtained by the producing method of the present invention, as necessary.

The additive agent described above is not particularly limited insofar as being mixed with the conjugated conductive polymer and the seed particles converted into the colloid protected by the polyanion. The additive agent described above for example includes a water soluble polymer compound, a water dispersible compound, an alkaline compound, a surfactant agent, an antifoaming agent, a coupling agent, an antioxidizing agent, an electric conductivity improver, and the like, and one of the materials is able to be independently used, or a combination of two or more thereof is able to be used as the additive agent.

The water soluble polymer compound is a water soluble polymer having a cationic group or a nonionic group in a main chain or a side chain of a polymer. A specific example of the water soluble polymer compound for example includes polyoxy alkylene, water soluble polyurethane, water soluble polyester, water soluble polyamide, water soluble polyimide, water soluble polyacryl, water soluble polyacrylamide, polyvinyl alcohol, polyacrylic acid, and the like. The polyoxy alkylene is preferable among them.

A specific example of polyoxy alkylene includes diethylene glycol, triethylene glycol, oligopolyethylene glycol, triethylene glycol monochlorohydrin, diethylene glycol monochlorohydrin, oligoethylene glycol monochlorohydrin, triethylene glycol monobromohydrin, diethylene glycol monobromohydrin, oligoethylene glycol monobromohydrin, polyethylene glycol, glycidyl ethers, polyethylene glycol glycidyl ethers, polyethylene oxide, triethylene glycol dimethyl ether, tetraethylene glycol dimethyl ether, diethylene glycol dimethyl ether, diethylene glycol diethyl ether, diethylene glycol dibutyl ether, dipropylene glycol, tripropylene glycol, polypropylene glycol, polypropylene dioxide, polyoxy ethylene alkyl ether, polyoxy ethylene glycerin fatty acid ester, polyoxy ethylene fatty acid amide, and the like.

The water dispersible compound is a water dispersible compound in which a part of a compound having low hydrophilicity is substituted with a functional group having high hydrophilicity, or a water dispersible compound in which a compound having a functional group with high hydrophilicity around a compound with low hydrophilicity is adsorbed (for example, emulsion or the like), and as the water dispersible compound, a water dispersible compound dispersed in water without being precipitated is included. A specific example includes polyester, polyurethane, an acrylic resin, a silicone resin, emulsion of these polymers, and the like.

As the water soluble polymer compound and the water dispersible compound, one of the materials is able to be independently used, or a combination of two or more thereof is able to be used. When the water soluble polymer compound and the water dispersible compound are added, it is possible to adjust the viscosity of the dispersion including the conductive polymer, and it is possible to improve coating performance.

The amount of the water soluble polymer compound and the water dispersible compound is preferably 1 part by mass to 4,000 parts by mass, is more preferably 20 parts by mass to 2,000 parts by mass, and is further preferably 50 parts by mass to 500 parts by mass, with respect to 100 parts by mass of the sum total of the conjugated conductive polymer and the seed particles converted into the colloid protected by the polyanion.

The alkaline compound may be added to the dispersion including the conductive polymer. By adding the alkaline compound, it is possible to impart corrosion resistance to the products to which the dispersion is applied, and it is possible to adjust the pH of the conductive polymer-containing dispersion. For example, in order to prevent corrosion of metal and metal oxide used in a solid electrolyte capacitor, it is preferable that the pH is adjusted to be 3 to 13. It is more preferable that the pH is adjusted to be 4 to 9, and it is further preferable that the pH is adjusted to be 5 to 7. When the pH is greater than or equal to 3, corrosion of a valve metal such as aluminum may not progress due to a valve metal to be used such as aluminum. In addition, when the pH is less than or equal to 13, the polyanion doped with the conductive polymer may not be dedoped.

The alkaline compound includes a known inorganic alkaline compound or a known organic alkaline compound is able to be used. As the inorganic alkaline compound, for example, ammonia, sodium hydroxide, potassium hydroxide, calcium hydroxide, ammonia, and the like. The organic alkaline compound includes aromatic amine, aliphatic amine, alkali metal alkoxide, and the like.

Among aromatic amines, a nitrogen-containing heteroaryl ring compound is preferable. The nitrogen-containing heteroaryl ring compound is a nitrogen-containing heterocyclic compound having aromatic properties. In the aromatic amine, a nitrogen atom included in a hetero ring is conjugated with the other atom.

The nitrogen-containing heteroaryl ring compound includes pyridines, imidazoles, pyrimidines, pyrazines, triazines, and the like. Pyridines, imidazoles, and pyrimidines are preferable among them, from a viewpoint of solvent solubility or the like.

The aliphatic amine for example includes ethyl amine, n-octyl amine, diethyl amine, diisobutyl amine, methyl ethyl amine, trimethyl amine, triethyl amine, allyl amine, 2-ethyl aminoethanol, 2,2'-iminodiethanol, N-ethyl ethylene diamine, and the like.

The alkali metal alkoxide for example includes sodium alkoxide such as sodium methoxide, and sodium ethoxide, potassium alkoxide, calcium alkoxide, and the like.

The surfactant agent includes an anionic surfactant agent such as a carboxylic acid salt, a sulfonic acid salt, a sulfuric acid ester salt, and a phosphoric acid ester salt; a cationic surfactant agent such as an amine salt, and a quaternary ammonium salt; an amphoteric surfactant agent such as carboxy betaine, an aminocarboxylic acid salt, and imidazolium betaine; a nonionic surfactant agent such as polyoxy ethylene alkyl ether, polyoxy ethylene glycerin fatty acid ester, ethylene glycol fatty acid ester, and polyoxy ethylene fatty acid amide, and the like.

The antifoaming agent includes a silicone resin, polydimethyl siloxane, a silicone resin, and the like.

The antioxidizing agent includes a phenol-based antioxidizing agent, an amine-based antioxidizing agent, a phosphorus-based antioxidizing agent, a sulfur-based antioxidizing agent, sugars, vitamins, and the like.

The electric conductivity improver is not particularly limited insofar as electric conductivity of the dispersion including the conductive polymer increases. The electric conductivity improver for example includes a compound having an ether bond such as tetrahydrofurane; a compound having a lactone group such as ibutyrolactone, and γ-valerolactone; a compound having an amide group or a lactam group such as caprolactam, N-methyl caprolactam, N,N-dimethyl acetamide, N-methyl acetamide, N,N-dimethyl formamide, N-methyl formamide, N-methyl formanilde, N-methyl pyrrolidone, N-octyl pyrrolidone, and pyrrolidone; a sulfone compound or a sulfoxide compound such as tetramethylene sulfone, and dimethyl sulfoxide; sugars or a sugar derivative such as sucrose, glucose, fructose, and lactose; sugar alcohols such as sorbitol, and mannitol; imides such as succinimide, and maleimide; a furane derivative such as 2-furane carboxylic acid, and 3-furane carboxylic acid; dialcohol or polyalcohol such as ethylene glycol, propylene glycol, glycerin, diethylene glycol, and triethylene glycol, and the like. Among them, tetrahydrofurane, N-methyl formamide, N-methyl pyrrolidone, ethylene glycol, propylene glycol, glycerin, dimethyl sulfoxide, and sorbitol are preferable, and among them, ethylene glycol, propylene glycol, and glycerin are more preferable, from a viewpoint of improving electric conductivity. As the electric conductivity improver, one of the materials is able to be independently used, or a combination of two or more thereof is able to be used.

According to the producing method of the present invention, by coordinating the polyanion on the surface of the seed particles, it is possible to control the particle diameter of the conductive polymer, and it is possible to suppress thickening at the time of the polymerization, and thus productivity of the conductive polymer-containing dispersion becomes excellent. In addition, the conjugated conductive polymer is able to be coordinated to the polyanion of the dopant in the conductive polymer, and thus conductivity of the conjugated conductive polymer is expressed while having transparency.

In addition, after the dispersion obtained by the producing method of the present invention is attached to the products, the dispersion medium is removed, and thus it is possible to impart a function such as conductivity to the products. An attachment method includes coating, spraying, dipping, and the like. By removing the dispersion medium from the dispersion obtained by the producing method of the present invention, it is possible to obtain a molding product such as a conductive polymer film or the like. As a removing method of the dispersion medium, a known method such as room temperature drying, heated air drying, and far infrared ray irradiation drying is able to be used.

EXAMPLES

The present invention will be more specifically described by the following examples, but the present invention is not limited to the examples.

In addition, physical properties of each of the examples and comparative examples were measured as follows.

(1) Solid Content Concentration

In a solid content concentration of the dispersion, approximately 2 g of the dispersion obtained in each of the examples was weighed in a specimen container, the dispersion was still stood one hour in a drier at 105° C., and then the mass of the specimen in the specimen container was measured, and the mass after drying to the mass before drying, that is, [mass after drying/mass before drying] was calculated as the solid content concentration.

(2) Viscosity

The viscosity of the dispersion during the polymerization was measured at 25° C. by using a No. 2 rotor in a B-type viscosimeter.

(3) pH

The pH of the dispersion obtained in each of the examples was measured at 25° C. by using pH meter (manufactured by DKK-TOA Corporation, a type HM-30G).

(4) Conductance

Ammonia water was added to the dispersion while stirring 100 g of the dispersion obtained in each of the examples. Next, 10 g of ethylene glycol was added, and thus a modified dispersion having a pH of 4.5 was obtained. On the basis of JIS K 7194, the dispersion of which the pH was adjusted was flow casted on a glass plate, and was dried by heated air at 100° C., and thus a film having a thickness of 10 μm was formed. Electric conductivity of the film was measured by Loresta (manufactured by Mitsubishi Chemical Corporation).

(5) Particle Diameter of Seed Particles

The particle diameter of the seed particles was measured by Microtrack UPA-type particle size distribution measurement device manufactured by Nikkiso Co., Ltd.

Example 1

Manufacturing Method of Seed Particles which were Converted into Colloid Protected by Polyanion An aqueous solution weighing 1,000 g and having 22 mass % of sodium polystyrene sulfonate (manufactured by Tosoh Organic Chemical Co., Ltd., a trade name of Polinas PS-5, and a weight-average molecular weight: approximately 120,000) was heated to 80° C. while stirring it in a nitrogen atmosphere. Persulfate potassium weighing 2 g was added to the solution, and monomer emulsion formed of 135 g of styrene, 15 g of divinyl benzene (DVB), and 500 g of an aqueous solution having 22 mass % of sodium polystyrene sulfonate (same as above), and 40 g of a persulfate potassium aqueous solution of 2.5 mass % were dropped for 2 hours and 2.5 hours, respectively. After the dropping, the mixture was maintained at 80° C. for 2 hours, and then was cooled to room temperature. 1,500 ml of a cation exchange resin and 1,500 ml of an anion exchange resin were added to the obtained reaction solution and were stirred for 12 hours, the ion exchange resin was filtered, and thus the dispersion (polystyrene emulsion) of the seed particles converted into the colloid protected by the polyanion was obtained. The particle diameter of d50 of the seed particles in the obtained polystyrene emulsion was 0.46 μm.

(Manufacturing Method of Conductive Polymer-Containing Dispersion Including Seed Particles which were Converted into Colloid Protected by Polyanion)

579.94 g of ion exchange water, 71.15 g of the polystyrene emulsion (a nonvolatile content of 28.0 mass %), and 36.05 g of an aqueous solution having 2 mass % of p-toluene sulfonic iron (III) 6-hydrate (FePTs) were mixed at 27° C. 8.57 g of 3,4-ethylenedioxy thiophene (EDOT) was added and mixed while irradiating the solution with an ultrasonic wave at 27° C.

18.0 g of sodium peroxodisulfate (NaPS) was added to the obtained mixed solution while being stirred with a stirring blade and being irradiated with an ultrasonic wave at 27° C., and thus a polymerization reaction was started. Next, 47.8 g of the polystyrene emulsion identical to that included in advance and 237.9 g of ion exchange water were mixed, and were dropped for 4 hours. After that, the reaction was performed while stirring the mixture at 27° C. for 4 hours with a stirring blade and irradiating the mixture with an ultrasonic wave.

After the reaction, 300 ml of a cation exchange resin and 300 ml of an anion exchange resin were added to the obtained reaction solution, and the reaction solution was stirred for 12 hours, and thus an unreacted monomer, an oxidation agent, and an oxidation catalyst were adsorbed in the ion exchange resin. By filtering the ion exchange resin, the seed particles (the polystyrene emulsion) converted into the colloid protected by a polystyrene sulfonic acid and a conductive polymer-containing dispersion formed of poly (3,4-ethylenedioxy thiophene) doped by a polystyrene sulfonic acid were obtained.

The respective physical properties of the dispersion obtained in Example 1 were measured by the method described above, and thus the solid content concentration was 4.2 mass %, the pH was 1.9, and the conductance was 93 S/cm.

Example 2

In the manufacturing of the seed particles, a conductive polymer-containing dispersion was obtained by the same method as that in Example 1 except that sodium polystyrene sulfonate (manufactured by Tosoh Organic Chemical Co., Ltd., a trade name of Polinas PS-1, and a molecular weight: approximately 10,000 to approximately 30,000) was used instead of the aqueous solution having 22 mass % of sodium polystyrene sulfonate (manufactured by Tosoh Organic Chemical Co., Ltd., a trade name of Polinas PS-5, and a weight-average molecular weight: approximately 120,000).

The particle diameter of d50 of the seed particles in the polystyrene emulsion was 0.15 μm. In addition, the respective physical properties of the dispersion obtained in Example 2 were measured by the method described above, and thus the solid content concentration was 4.2 mass %, the pH was 1.9, and the conductance was 95 S/cm.

Example 3

In the manufacturing of the seed particles, a conductive polymer-containing dispersion was obtained by the same method as that in Example 1 except that the added amount of 2.5 mass % of the persulfate potassium aqueous solution was changed from 40 g to 20 g.

The particle diameter of d50 of the seed particles in the polystyrene emulsion was 0.95 μm. In addition, the respective physical properties of the dispersion obtained in Example 3 were measured by the method described above, and thus the solid content concentration was 4.2 mass %, the pH was 1.9, and the conductance was 90 S/cm.

Example 4

In the manufacturing of the dispersion, a conductive polymer-containing dispersion was obtained by the same method as that in Example 1 except that 10.10 g of an aqueous solution having 2 mass % of sulfuric iron ($FeSO_4$) was added instead of adding 36.05 g of the aqueous solution (FePTs) having 2 mass % of the p-toluene sulfonic iron (III) 6-hydrate.

The particle diameter of d50 of the seed particles in the polystyrene emulsion was 0.46 μm. In addition, the respective physical properties of the dispersion obtained in Example 4 were measured by the method described above, and thus the solid content concentration was 4.2 mass %, the pH was 1.9, and the conductance was 93 S/cm.

Example 5

In the manufacturing of the dispersion, conductive polymer-containing dispersion was obtained by the same method as that in Example 1 except that the reaction was performed while dispersing the mixed solution for 4 hours by using a dispersion pulverizer (manufactured by IKA corporation, and a trade name of Magic Lab) instead of reacting the mixed solution while stirring the mixed solution for 4 hours with a stirring blade and irradiating the mixed solution with an ultrasonic wave.

The particle diameter of d50 of the seed particles in the polystyrene emulsion was 0.46 μm. In addition, the respective physical properties of the dispersion obtained in Example 5 were measured by the method described above, and thus the solid content concentration was 4.2 mass %, the pH was 1.9, and the conductance was 85 S/cm.

Example 6

In the manufacturing of the dispersion, a conductive polymer-containing dispersion was obtained by the same method as that in Example 1 except that 7.71 g of 3,4-ethylenedioxy thiophene (EDOT) and 0.86 g of pyrrol (1H-pyrrol) were added instead of adding 8.57 g of the 3,4-ethylenedioxy thiophene (EDOT), and a time period of performing the stirring by using a stirring blade and the ultrasonic irradiation was changed from 4 hours to 3 hours.

The particle diameter of d50 of the seed particles in the polystyrene emulsion was 0.46 μm. In addition, the respective physical properties of the dispersion obtained in Example 6 were measured by the method described above, and thus the solid content concentration was 4.2 mass %, the pH was 1.9, and the conductance was 87 S/cm.

Example 7

A conductive polymer-containing dispersion was obtained by the same method as that in Example 1 except that persulfate ammonium (APS) was added instead of adding the persulfate potassium in the manufacturing of the seed particles, and 17.0 g of persulfate ammonium (APS) was added instead of adding 18.0 g of the sodium peroxodisulfate (NaPS) in the manufacturing of the dispersion.

The particle diameter of d50 of the seed particles in the polystyrene emulsion was 0.46 μm. In addition, the respective physical properties of the dispersion obtained in Example 7 were measured by the method described above, and thus the solid content concentration was 4.2 mass %, the pH was 1.9, and the conductance was 93 S/cm.

Example 8

In the manufacturing of the seed particles, a conductive polymer-containing dispersion was obtained by the same method as that in Example 1 except that the added amount of the styrene was changed from 135 g to 150 g, and the divinyl benzene (DBV) was not added.

The particle diameter of d50 of the seed particles in the polystyrene emulsion was 0.60 μm. In addition, the respective physical properties of the dispersion obtained in Example 8 were measured by the method described above, and thus the solid content concentration was 4.2 mass %, the pH was 1.9, and the conductance was 94 S/cm.

Example 9

In the manufacturing of the seed particles, a conductive polymer-containing dispersion was obtained by the same method as that in Example 1 except that 150 g of methyl methacrylate (MMA) was added instead of adding 135 g of the styrene and 15 g of the divinyl benzene (DVB).

The particle diameter of d50 of the seed particles in the polystyrene emulsion was 0.38 μm. In addition, the respective physical properties of the dispersion obtained in Example 9 were measured by the method described above, and thus the solid content concentration was 4.2 mass %, the pH was 1.9, and the conductance was 90 S/cm.

Example 10

In the manufacturing of the seed particles, a conductive polymer-containing dispersion was obtained by the same method as that in Example 1 except that 150 g of t-butyl methacrylate (t-BMA) was added instead of adding 135 g of the styrene and 15 g of the divinyl benzene (DBV).

The particle diameter of d50 of the seed particles in the polystyrene emulsion was 0.72 μm. In addition, the respective physical properties of the dispersion obtained in Example 10 were measured by the method described above, and thus the solid content concentration was 4.2 mass %, the pH was 1.9, and the conductance was 90 S/cm.

Example 11

In the manufacturing of the seed particles, a conductive polymer-containing dispersion was obtained by the same method as that in Example 1 except that 67.5 g of styrene was added instead of adding 135 g of the styrene, and 67.5 g of methyl methacrylate was added.

The particle diameter of d50 of the seed particles in the polystyrene emulsion was 0.50 μm. In addition, the respective physical properties of the dispersion obtained in Example 11 were measured by the method described above, and thus the solid content concentration was 4.2 mass %, the pH was 1.9, and the conductance was 92 S/cm.

Example 12

In the manufacturing of the dispersion, a conductive polymer-containing dispersion was obtained by the same method as that in Example 1 except that the stirring by using a stirring blade and the ultrasonic irradiation for 4 hours were not performed.

The particle diameter of d50 of the seed particles in the polystyrene emulsion was 0.46 μm. In addition, the respective physical properties of the dispersion obtained in Example 12 were measured by the method described above, and thus the solid content concentration was 4.2 mass %, the pH was 1.9, and the conductance was 83 S/cm.

Comparative Example 1

593.24 g of ion exchange water, 58.44 g of an aqueous solution having 22 mass % of a polystyrene sulfonic acid (manufactured by Tosoh Organic Chemical Co., Ltd., a trade name of Polinas PS-50, and a weight-average molecular weight: approximately 230,000), and 36.05 g of an aqueous solution having 2 mass % of p-toluene sulfonic iron (III) 6-hydrate were mixed at 27° C. 8.57 g of 3,4-ethylenedioxy thiophene was added and mixed at 27° C. while irradiating the solution with an ultrasonic wave.

18.0 g of sodium peroxodisulfate was added to the obtained mixed solution while being stirred at 27° C. with a stirring blade and being irradiated with an ultrasonic wave, and thus a polymerization reaction was started. Next, 39.0 g of an aqueous polystyrene sulfonic acid solution identical to that included in advance and 246.8 g of ion exchange water were mixed, and were dropped for 4 hours. After that, the reaction was performed while stirring the mixture for 4 hours with a stirring blade and irradiating the mixture with an ultrasonic wave at 27° C.

After the reaction, 300 ml of a cation exchange resin and 300 ml of an anion exchange resin were added to the obtained reaction solution, and the reaction solution was stirred for 12 hours, and thus an unreacted monomer, an oxidation agent, and an oxidation catalyst were adsorbed in the ion exchange resin. By filtering the ion exchange resin, a dispersion including poly(3,4-ethylenedioxy thiophene) and a polystyrene sulfonic acid doped thereto was obtained.

The respective physical properties of the dispersion obtained in Comparative Example 1 were measured by the method described above, and thus the solid content concentration was 3.0 mass %, the pH was 1.9, and the conductance was 102 S/cm.

Comparative Example 2

A conductive polymer-containing dispersion was obtained by the same method as that in Comparative Example 1 except that 7.71 g of 3,4-ethylenedioxy thiophene (EDOT) and 0.86 g of pyrrol (1H-pyrrol) were added instead of adding 8.57 g of 3,4-ethylenedioxy thiophene (EDOT), and a time period of performing the stirring by using a stirring blade and the ultrasonic irradiation was changed from 4 hours to 3 hours.

The respective physical properties of the dispersion obtained in Comparative Example 2 were measured by the method described above, and thus the solid content concentration was 3.0 mass %, the pH was 1.9, and the conductance was 92 S/cm.

Comparative Example 3

A conductive polymer-containing dispersion was obtained by the same method as that in Comparative Example 1 except that the stirring by using a stirring blade and the ultrasonic irradiation for 4 hours were not performed.

The respective physical properties of the dispersion obtained in Comparative Example 3 were measured by the method described above, and thus the solid content concentration was 3.0 mass %, the pH was 1.9, and the conductance was 86 S/cm.

Comparative Example 4

An attempt was made to manufacture a conductive polymer-containing dispersion by the same method as that in Comparative Example 1 except that the added amount of the 3,4-ethylenedioxy thiophene (EDOT) was changed from 8.57 g to 12.00 g, the added amount of the aqueous solution having 2 mass % of p-toluene sulfonic iron (III) 6-hydrate (FePTs) was changed from 36.05 g to 50.48 g, the added amount of the sodium peroxodisulfate (NaPS) was changed from 18.0 g to 25.2 g, and the stirring by using a stirring blade and the ultrasonic irradiation for 4 hours were not performed, but the reaction solution was thickened, and thus the dispersion was not obtained.

In Examples 1 to 12, conditions of the manufacturing method of the seed particles converted into the colloid protected by the polyanion were shown in Table 1.

TABLE 3

|  |  | Comparative Example 1 | Comparative Example 2 | Comparative Example 3 | Comparative Example 4 |
|---|---|---|---|---|---|
| Monomer | EDOT (g) | 8.57 | 7.71 | 8.57 | 12.00 |
|  | Pyrrol (g) | — | 0.86 | — | — |
| Catalyst | FePTs (g) 2 mass % | 36.05 | 36.05 | 36.05 | 50.48 |
| Initiator | NaPS (g) | 18 | 18 | 18 | 25.2 |
| Dispersion Treatment Time | Ultrasonic Wave (hr) | 4 | 3 | — | — |
| Solid Content Concentration (%) |  | 3.0 | 3.0 | 3.0 | 4.1 |
| pH |  | 1.9 | 1.9 | 1.9 | — |
| Conductance (S/cm) |  | 102 | 92 | 86 | — |

In addition, the viscosity of each hour at the time of the conductive polymer reaction in Examples 1 to 12 and Comparative Examples 1 to 3 described above was shown in Table 4. Furthermore, the viscosity of Comparative Example 4 was not measured.

TABLE 1

|  |  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Ethylenically Unsaturated Monomer | Styrene (g) | 135 | 135 | 135 | 135 | 135 | 135 | 135 | 150 | — | — | 67.5 | 135 |
|  | MMA (g) | — | — | — | — | — | — | — | — | 150 | — | 67.5 | — |
|  | t-BMA (g) | — | — | — | — | — | — | — | — | — | 150 | — | — |
| Cross-Linking Agent | DVB (g) | 15 | 15 | 15 | 15 | 15 | 15 | 15 | — | — | — | 15 | 15 |
| Polyanion | PS-5 (g) | 330 | — | 330 | 330 | 330 | 330 | 330 | 330 | 330 | 330 | 330 | 330 |
|  | PS-1 (g) | — | 330 | — | — | — | — | — | — | — | — | — | — |
| Initiator | Potassium Persulfate (g) | 3 | 3 | 3 | 3 | 3 | 3 | — | 3 | 3 | 3 | 3 | 3 |
|  | APS (g) | — | — | — | — | — | — | 3 | — | — | — | — | — |
| Particle Diameter (μm) |  | 0.46 | 0.15 | 0.95 | 0.46 | 0.46 | 0.46 | 0.46 | 0.60 | 0.38 | 0.72 | 0.50 | 0.46 |

In Examples 1 to 12, conditions of the method for producing a conductive polymer-containing dispersion including the seed particles converted into the colloid protected by the polyanion were shown in Table 2.

TABLE 2

|  |  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Monomer | EDOT (g) | 8.57 | 8.57 | 8.57 | 8.57 | 8.57 | 7.71 | 8.57 | 8.57 | 8.57 | 8.57 | 8.57 | 8.57 |
|  | Pyrrol (g) | — | — | — | — | — | — | — | — | — | — | — | — |
| Catalyst | FePTs (g) 2 mass % | 36.05 | 36.05 | 36.05 | — | 36.05 | 36.05 | 36.05 | 36.05 | 36.05 | 36.05 | 36.05 | 36.05 |
|  | FeSO$_4$ (g) 2 mass % | — | — | — | 10.10 | — | — | — | — | — | — | — | — |
| Initiator | NaPS (g) | 18 | 18 | 18 | 18 | 18 | 18 | — | 18 | 18 | 18 | 18 | 18 |
|  | APS (g) | — | — | — | — | — | — | 17 | — | — | — | — | — |
| Dispersion Treatment Time | Ultrasonic Wave (hr) | 4 | 4 | 4 | 4 | — | 3 | 4 | 4 | 4 | 4 | 4 | — |
|  | Magic Lab (hr) | — | — | — | — | 4 | — | — | — | — | — | — | — |
| Solid Content Concentration (%) |  | 4.2 | 4.2 | 4.2 | 4.2 | 4.2 | 4.2 | 4.2 | 4.2 | 4.2 | 4.2 | 4.2 | 4.2 |
| pH |  | 1.9 | 1.9 | 1.9 | 1.9 | 1.9 | 1.9 | 1.9 | 1.9 | 1.9 | 1.9 | 1.9 | 1.9 |
| Conductance (S/cm) |  | 93 | 95 | 90 | 93 | 85 | 87 | 93 | 94 | 90 | 90 | 92 | 83 |

In Comparative Examples 1 to 4, conditions of the method for producing a conductive polymer-containing dispersion including the polyanion were shown in Table 3.

TABLE 4

| | | \multicolumn{7}{c}{Reaction Time (hour)} | | | | | | |
| --- | --- | --- | --- | --- | --- | --- | --- | --- |
| | | 0 | 1 | 2 | 3 | 4 | 5 | 6 |
| Viscosity At The Time Of Reaction (mPa · s) | Example 1 | 5 | 50 | 1300 | 3500 | 1600 | 700 | 100 |
| | Example 2 | 5 | 60 | 1500 | 4500 | 2100 | 900 | 175 |
| | Example 3 | 5 | 45 | 1100 | 2900 | 1400 | 550 | 80 |
| | Example 4 | 5 | 50 | 1350 | 3400 | 1630 | 650 | 100 |
| | Example 5 | 5 | 40 | 560 | 2000 | 900 | 450 | 75 |
| | Example 6 | 5 | 100 | 2500 | 2100 | 950 | 250 | 70 |
| | Example 7 | 5 | 50 | 1200 | 3200 | 1400 | 550 | 85 |
| | Example 8 | 5 | 60 | 1600 | 3200 | 1800 | 1000 | 130 |
| | Example 9 | 5 | 50 | 1100 | 3800 | 1900 | 900 | 90 |
| | Example 10 | 5 | 120 | 1900 | 2900 | 2200 | 1100 | 250 |
| | Example 11 | 5 | 60 | 1300 | 3500 | 1800 | 950 | 110 |
| | Example 12 | 5 | 210 | 2200 | 4300 | 2800 | 800 | 120 |
| | Comparative Example 1 | 5 | 60 | 5000 | 6000 | 3500 | 1300 | 500 |
| | Comparative Example 2 | 5 | 150 | 4500 | 5100 | 1950 | 480 | 160 |
| | Comparative Example 3 | 5 | 320 | 4300 | 7100 | 4200 | 1000 | 200 |

From Examples 1 to 12, it is found that the conductive polymer-containing dispersion includes the seed particles converted into the protective colloid, and thus it is possible to considerably decrease the viscosity at the time of the conductive polymer reaction, and conductivity sufficiently satisfying conductance to practicality is obtained. In addition, the dispersion including the conductive polymer reactant having suitable viscosity was able to be obtained in a short period of time.

In Comparative Examples 1 to 3, it is found that the viscosity at the time of the conductive polymer reaction significantly increases, and thus is degraded compared to the examples from a viewpoint of productivity.

INDUSTRIAL APPLICABILITY

The method for producing a conductive polymer-containing dispersion of the present invention is able to manufacture the dispersion including the conductive polymer having excellent conductivity with excellent productivity, and thus it is useful for manufacturing an electronic component using the conductive polymer-containing dispersion.

The invention claimed is:

1. A method for producing a conductive polymer-containing dispersion, comprising:
    preparing seed particles by polymerizing an ethylenically unsaturated monomer in a solution that comprises a polyanion so as to form a dispersion medium comprising the seed particles converted into a colloid protected by the polyanion;
    adding a monomer to the dispersion medium; and
    polymerizing the monomer in the dispersion medium to obtain a conjugated conductive polymer on the surface of the seed particles protected by the polyanion.

2. The method for producing a conductive polymer-containing dispersion according to claim 1,
    wherein the seed particles formed in the step of polymerizing the ethylenically unsaturated monomer comprise a polymer or a copolymer.

3. The method for producing a conductive polymer-containing dispersion according to claim 1,
    wherein a particle diameter of d50 of the seed particles is 0.005 μm to 10 μm.

4. The method for producing a conductive polymer-containing dispersion according to claim 1, comprising:
    a second additive step, wherein additional seed particles converted into the colloid protected by the polyanion are added to the dispersion medium during the polymerization step.

5. The method for producing a conductive polymer-containing dispersion according to claim 1,
    wherein a dispersion treatment is performed with respect to the generated conjugated conductive polymer during the polymerization step.

6. The method for producing a conductive polymer-containing dispersion according to claim 5,
    wherein the dispersion treatment is performed by ultrasonic irradiation.

7. The method for producing a conductive polymer-containing dispersion according to claim 1,
    wherein the monomer for obtaining a conjugated conductive polymer is at least one selected from pyrrol which may have a substituent group, aniline which may have a substituent group, and thiophene which may have a substituent group.

8. The method for producing a conductive polymer-containing dispersion according to claim 1,
    wherein the monomer for obtaining a conjugated conductive polymer includes a compound denoted by Formula (I) described below,

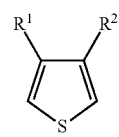

(I)

wherein in Formula (I), $R^1$ and $R^2$ each independently represent a hydrogen atom, a hydroxyl group, an alkyl group having carbon atoms of 1 to 18 which may have a substituent group, an alkoxy group having carbon atoms of 1 to 18 which may have a substituent group, or an alkylthio group having carbon atoms of 1 to 18 which may have a substituent group, and alternatively represent an alicyclic ring having carbon atoms of 3 to 10 which may have a substituent group, an aromatic ring having carbon atoms of 6 to 10 which may have a substituent group, an oxygen atom-containing heterocyclic ring having carbon atoms of 2 to 10 which may have a substituent group, a sulfur atom-containing heterocyclic ring having carbon atoms of 2 to 10 which may have a substituent group, or a sulfur atom and oxygen atom-containing heterocyclic ring having carbon atoms of 2 to 10 which may have a substituent group in which $R^1$ and $R^2$ are bonded to each other in order to form a ring.

9. The method for producing a conductive polymer-containing dispersion according to claim 1,
    wherein the polyanion is a polymer having a group formed of a sulfonic acid or a salt thereof.

10. The method for producing a conductive polymer-containing dispersion according to claim 1,
    wherein an anion group in the polyanion is 0.25 mol to 30 mol with respect to 1 mol of the monomer for obtaining a conjugated conductive polymer.

11. The method for producing a conductive polymer-containing dispersion according to claim 1, wherein the dispersion medium includes water, and
the polymerization is performed by using at least one oxidation agent selected from a peroxodisulfuric acid and a salt thereof.

12. The method for producing a conductive polymer-containing dispersion according to claim 1,
wherein the polyanion is soluble in the dispersion medium and is able to coordinate on the seed particles in the dispersion medium.

13. The method for producing a conductive polymer-containing dispersion according to claim 1,
wherein the amount of the ethylenically unsaturated monomer used with respect to 100 parts by mass of the amount of the polyanion used in the manufacturing of the seed particles converted into the colloid protected by the polyanion is 20 parts by mass to 90 parts by mass.

14. The method for producing a conductive polymer-containing dispersion according to claim 1,
wherein the dispersion medium includes water or a mixed solvent of water and a water soluble solvent.

15. The method for producing a conductive polymer-containing dispersion according to claim 2,
wherein the ethylenically unsaturated monomer includes styrene.

16. The method for producing a conductive polymer-containing dispersion according to claim 9,
wherein the main chain of the polyanion is polyalkylene.

17. The method for producing a conductive polymer-containing dispersion according to claim 1,
wherein the polyanion is polystyrene sulfonic acid or salt thereof.

* * * * *